UNITED STATES PATENT OFFICE.

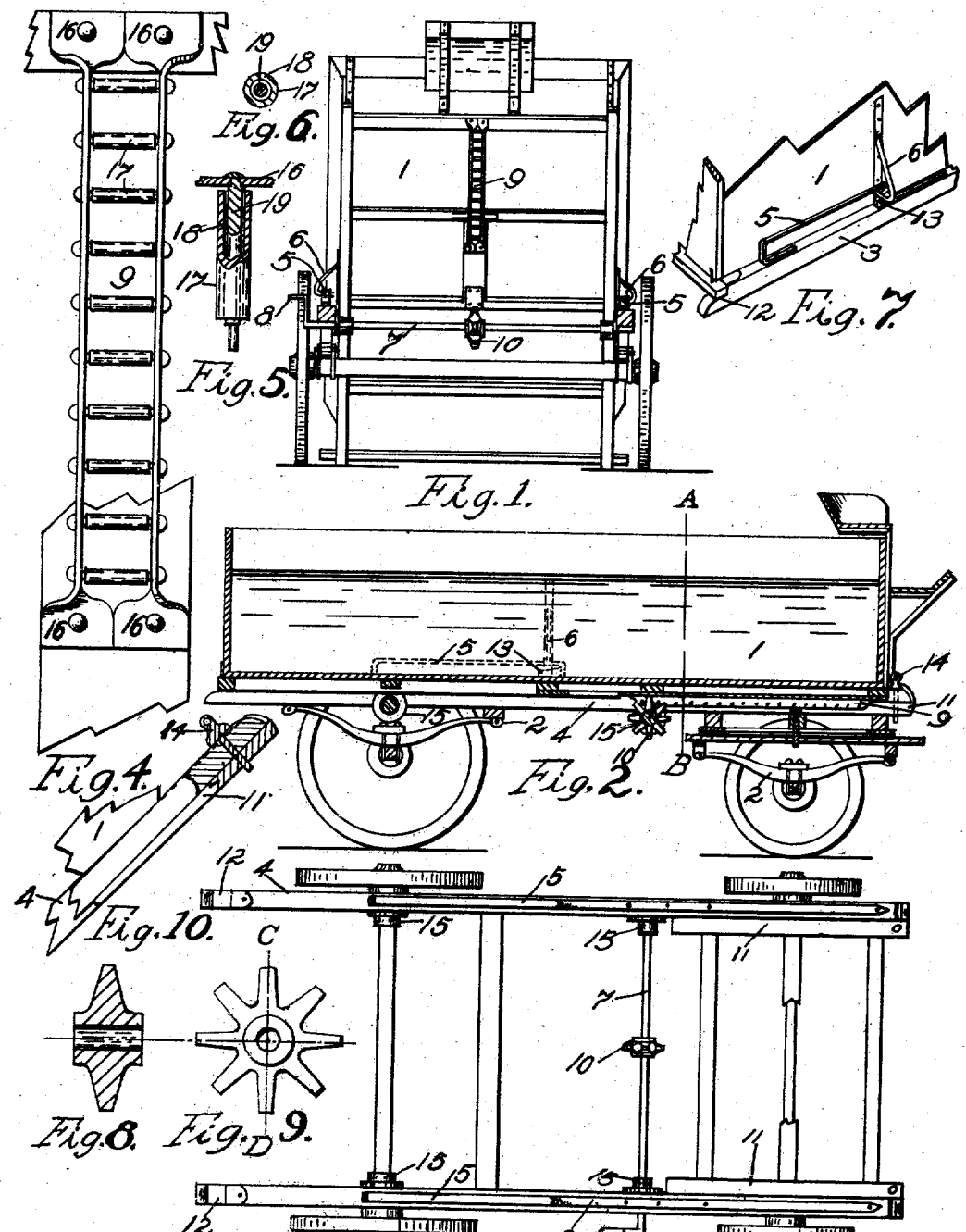

JOHN BRENNAN, OF LOUISVILLE, KENTUCKY.

DUMPING-WAGON.

No. 853,494.   Specification of Letters Patent.   Patented May 14, 1907.

Application filed February 28, 1906. Serial No. 303,334.

*To all whom it may concern:*

Be it known that I, JOHN BRENNAN, a citizen of the United States, residing at Louisville, in the county of Jefferson and State of Kentucky, have invented a new and useful Dumping-Wagon, of which the following is a specification.

This invention relates to dumping wagons for hauling coal, and like purposes; and the objects of my improvement are, ease of manipulation, simplicity and comparative inexpensiveness of manufacture, durability, and immunity from derangement. These objects I attain by means of the mechanism illustrated in the accompanying drawings, in which—

Figure 1 is a front view showing the wagon bed in dumped position and the running-gear in section on line A—B of Fig. 2; Fig. 2, a vertical longitudinal section; Fig. 3, a plan view of the running-gear; Fig. 4, a plan view of the rack; Fig. 5, a longitudinal sectional detail view of one of the rungs of the rack; Fig. 6, a transverse sectional view of the rung; Fig. 7, a perspective detail view of the stop-loop and related parts; Fig. 8, a sectional view of the pinion on line C—D of Fig. 9; Fig. 9, a side view of the pinion; and, Fig. 10, a sectional detail view of the front inclined plane and related parts.

Similar reference numerals refer to similar parts throughout the several views of the drawing.

The wagon bed 1 rests upon the running-gear 2 in the usual manner, and is adapted to be moved backward on the running-gear until it over-balances and dumps the load in the position shown in Fig. 1. The running-gear 2 is provided with side rails, 3 and 4, between which the bottom of the bed 1 moves. The sides of the wagon bed are provided with brackets, 6, which are adapted to move in guide loops, 5, attached to the top of rails 3 and 4. By this means the bed is prevented from leaving the running-gear, and pivots or trunnions are provided on which the bed tilts. Loops 5 are of such a length as to stop the bed at the proper position while going forward to insert the pins 14 through the bottom rails of the bed and the pieces 11 so that it cannot be moved backward out of position, and also limit the rearward motion so as to stop the bed in the proper position for dumping.

Antifriction rollers 15 are provided over the rear axle on the running-gear, and also toward the front on shaft 7, to facilitate moving the bed longitudinally.

For moving the bed, a pinion, 10, is provided on shaft 7, operated by a crank, 8, and adapted to mesh with a rack 9 longitudinally disposed on the bottom of bed 1 over the pinion.

When the bed is moved forward to the normal or hauling position, it does not rest upon rollers 15, but is raised therefrom by being moved upon inclined planes, 11, on the front part of the running-gear, 12, at the rear end of side bars 3 and 4, and on blocks, 13, under guide brackets 6, thus supporting the bed at both ends and in the middle.

The rack 9 is formed of side bars 16, placed edgewise and connected by equally spaced rungs, 17, of suitable pitch to work with pinion 10. The rungs 17 are preferably made of round rods 19, reduced at the ends, and riveted in side bars 16, and covered with a tubular sleeve, 18, which forms an antifriction roller. Of course, the roller 18 may be dispensed with and bare rungs of the proper diameter used. Pinion 10 is provided with long pyramidal teeth in order to allow considerable vertical motion of the rack 9 and the rack still to remain in operative mesh with the pinion. Heretofore, the conventional rack and pinion has been used for this purpose, but in this case, a slight upward motion of the bed has separated the pitch lines of the rack and the pinion so that the pinion failed to engage the rack properly, and the device failed to operate. It will be understood that, with my pinion, provided with long teeth, and my rack, made of rungs which accommodate the long teeth, the difficulty just mentioned is obviated. This mechanism also provides for the upward movement of the bed on the inclined planes so as to relieve rollers 15 of the load, and yet insure the pinion and rack being in operative mesh.

The operation of the mechanism will now be obvious. The bed being in normal or hauling postion, as shown in Fig. 2, the wagon may be loaded, and the load rests upon firm supports on inclined parts 11, 12, and 13; and pins 14 are inserted through the holes provided in the forward ends of the bottom rails of the bed and the inclined planes 11 so as to prevent the backward motion of the bed. When the wagon is to be unloaded, pins 14 are removed, and crank 8 is operated in the proper direction to run the bed toward the rear. At first the bed slides down the inclined planes, soon resting upon rollers 15. It now easily rolls backward until its motion is stopped by guide brackets 6 coming in contact with the rear end of guide-loops 5. In this position, the center of bed 1 will be slightly to the rear of rear rollers 15, and the bed will tilt to the dumping position, as shown in Fig. 1, rack 9 leaving pinion 10. After unloading, the driver throws the front end of the bed down until rack 9 engages pinion 10; and he operates crank 8 in the direction to move the bed forward until it rests upon the inclined planes, where its forward motion is limited by guide brackets 6 resting against the forward end of guide-loop 5. Pins 14 is now inserted, and the wagon is ready for reloading and hauling.

Having thus described my invention so that any one skilled in the art pertaining thereto may make or use it, I claim—

1. In a dumping wagon, the combination of a wagon bed, a running-gear, said wagon bed mounted on said running-gear to move longitudinally for dumping, a rack fixed to said wagon bed consisting of side pieces joined by rungs, and a pinion provided with long pyramidal teeth mounted on said running-gear in operative mesh with said rack, substantially as specified.

2. In a dumping wagon, the combination of a bed, a running-gear, a rack fixed on the bottom of said bed and comprising side bars joined by rungs provided with rollers, and a pinion mounted in said running-gear to mesh with said rack.

3. In a dumping wagon, the combination of a wagon bed, a running-gear, a rack comprising side bars and rungs fixed on said bed, a pinion having pyramidal teeth mounted on said running-gear to mesh with said rack, antifriction rollers mounted on said running-gear for rolling said bed on, and inclined planes on said running-gear to relieve said rollers of the load when said bed is in hauling position, substantially as specified.

JOHN BRENNAN.

Witnesses:
J. M. BRENNAN,
ABRAHAM KNOBEL.